UNITED STATES PATENT OFFICE.

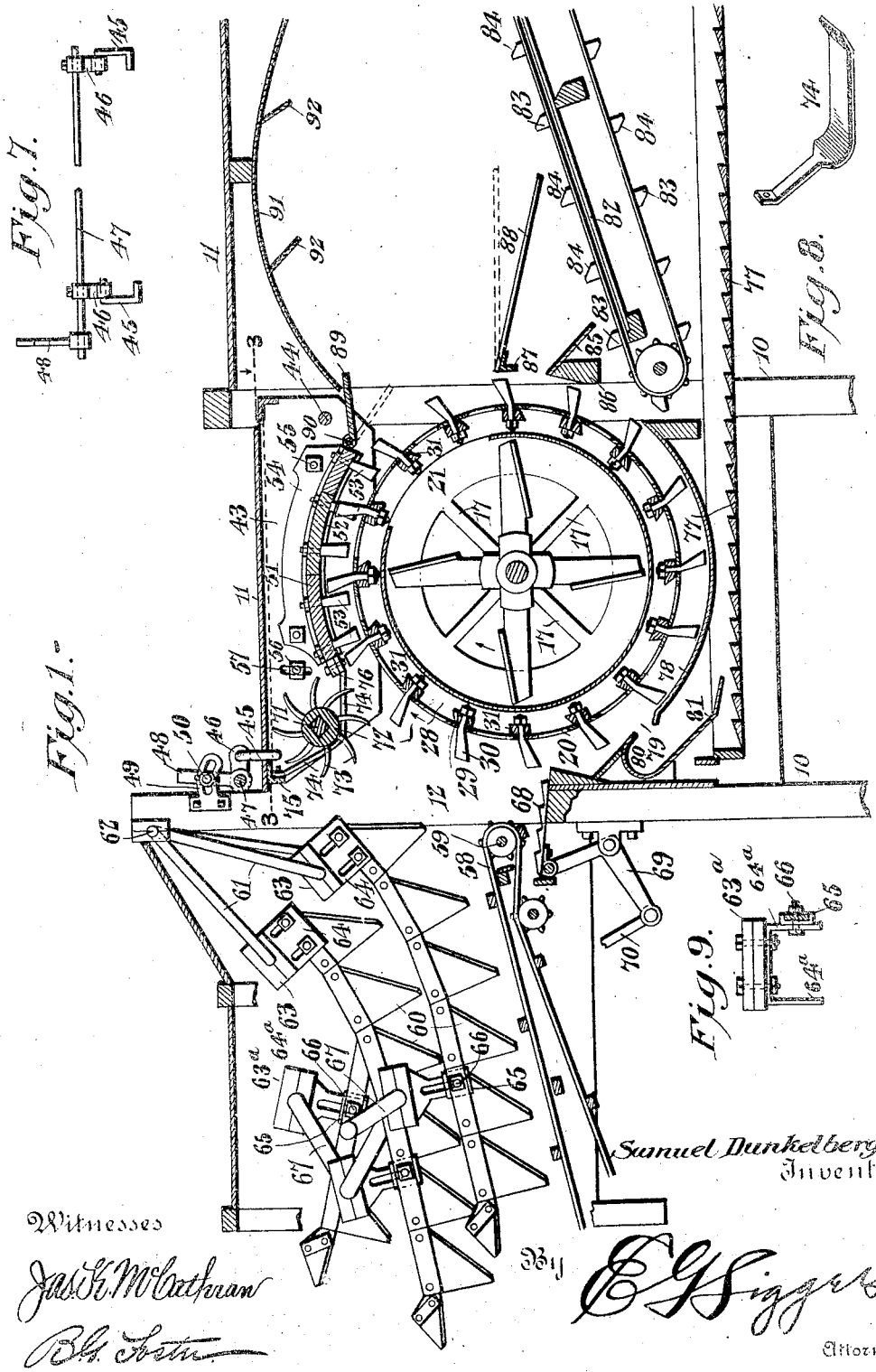

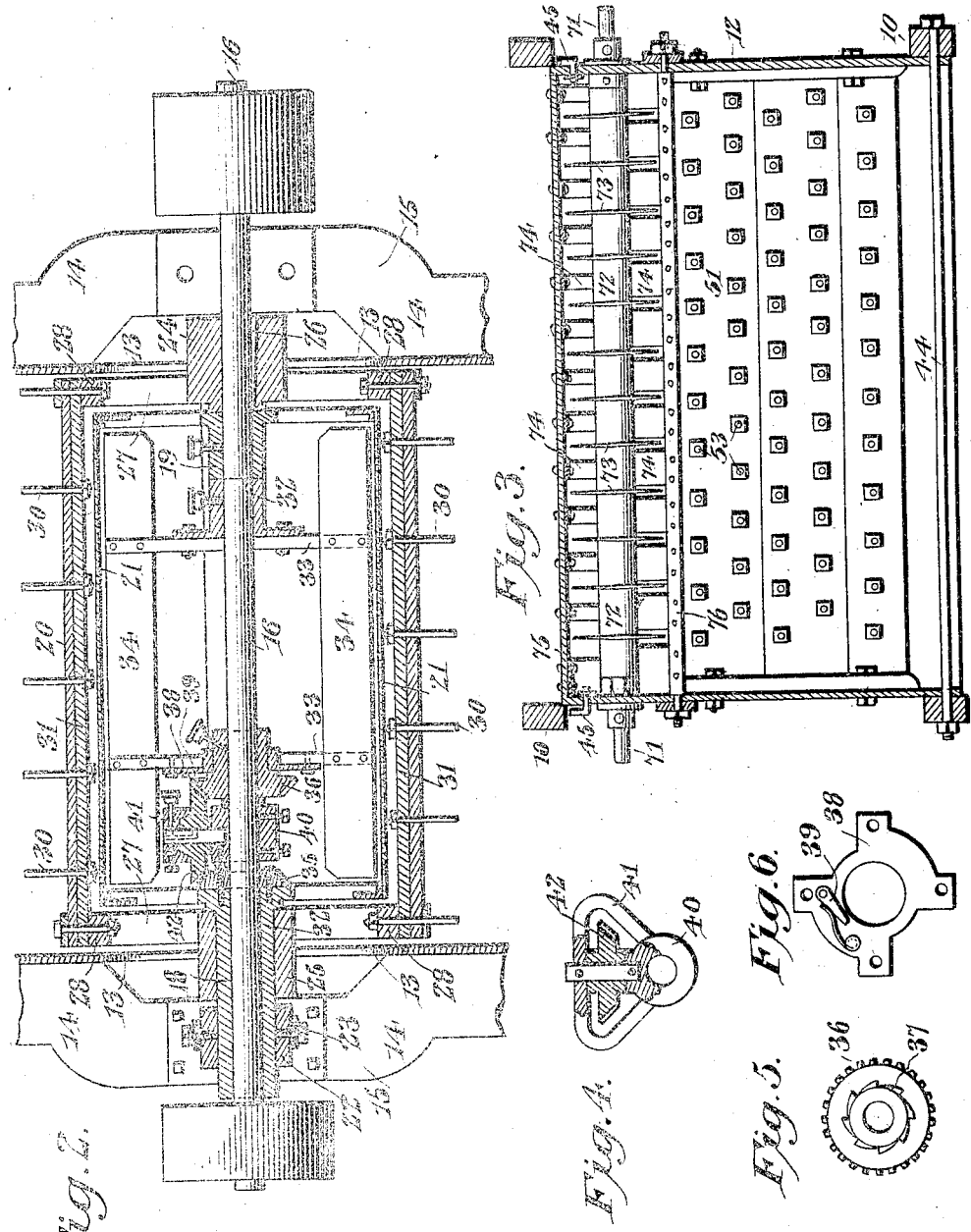

SAMUEL DUNKELBERGER, OF NEWTON, KANSAS.

GRAIN-SEPARATOR.

No. 831,420.

Specification of Letters Patent.

Patented Sept. 18, 1906.

Application filed August 1, 1905. Serial No. 272,248.

*To all whom it may concern:*

Be it known that I, SAMUEL DUNKELBERGER, a citizen of the United States, residing at Newton, in the county of Harvey and State of Kansas, have invented a new and useful Grain-Separator, of which the following is a specification.

The invention relates to improvements in means for separating grain from straw.

One of the principal objects is to provide novel means for generating and delivering an effective blast of air through the straw as the same leaves the threshing mechanism in order to thoroughly loosen and agitate said straw, thereby securing a more thorough separation of the grain therefrom.

Another important object is to provide novel overshot threshing mechanism which will thoroughly thresh straw and deliver it to the separating means, will permit the use of a low feeder, and is provided with mechanism that will prevent small solid wads or bundles of grain being jerked into and slugging the cylinder, said means being adjustable to the different grades and conditions of grain.

The preferred embodiment of the invention is illustrated in the accompanying drawings and is described in the following specification. An inspection of the claims will, however, clearly indicate that said invention is not limited solely to the structure herein disclosed.

In the drawings, Figure 1 is a vertical longitudinal sectional view through a portion of a grain-separator embodying the novel features of the invention. Fig. 2 is a cross-sectional view through the threshing-cylinder and mechanism associated therewith.
Fig. 3 is a horizontal sectional view taken substantially on the line 3 3 of Fig. 1 and showing a top plan view of the concave and retarder. Fig. 4 is a detail sectional view through the gear-wheel and its mounting, which is carried by the shaft. Fig. 5 is a detail view in elevation of the gear-wheel associated with the fan and showing one of the clutch members. Fig. 6 is a detail view of the associated clutch member carried by the fan. Fig. 7 is a detail view in elevation of the adjusting means for the concave and retarder. Fig. 8 is a detail perspective view of one of the guard-plates of said retarder. Fig. 9 is a sectional view showing one of the mountings for the cutter-bars.

Similar reference-numerals designate corresponding parts in all the figures of the drawings.

In the embodiment illustrated a machine-casing is employed which includes a frame 10, a deck 11, and side walls 12, the side walls being provided with alined air-inlet openings 13. Secured to the opposite sides of the machine-casing are bearing-supports 14, having portions extending across the air-inlet openings 13, which portions are offset, as clearly shown at 15.

Journaled on the supports 14 and extending through the openings 13 and across the casing is a driving-shaft 16, which projects beyond the supports 14, as shown in Fig. 2. Surrounding the shaft and located within the machine-casing is a fan-casing comprising heads that are in the form of spider-frames 17, having hubs 18 and 19, in which the shaft 16 freely rotates. An annular wall 20, connecting the heads, has an opening therethrough forming a discharge-throat 21. One of the hubs 18 of the fan-casing is extended through the adjacent air-inlet opening 13 of the side wall of the machine and has its outer end fitted into a bearing 22, in which it is secured against rotation by suitable setscrews 23. The fan-casing is thus positively held against rotation, while the shaft is freely rotatable.

Secured to and rotating with the shaft 16 is a threshing member in the form of a cylinder having hubs 24 and 25, the hub 24 being keyed, as shown at 26, or otherwise secured to the shaft, the hub 25 being loosely journaled on the fixed hub 18 of the fan-casing. These hubs are provided with radially-disposed arms 27, carrying rings 28 at their outer ends, the whole thus forming heads which are connected by bars 29, carrying teeth 30, the front edges or sides of said bars being preferably beveled, as clearly shown at 31 in Fig. 1. Thus it will be seen that the threshing-cylinder is freely rotatable about the fixed fan-casing, that said cylinder is secured to the shaft, and that the casing is also mounted on the shaft. The cylinder, as clearly shown in Fig. 1, is of the overshot type—that is to say, its lower portion travels forwardly and its upper portion travels rearwardly, the reverse of the common type of machine.

Supported by the shaft 16 within the fan-casing is a fan comprising hubs 32, loosely journaled upon the shaft inside the hubs of the fan-casing. These hubs are provided with radial arms 33, carrying fan-blades 34, that rotate within the casing. It is very desirable, particularly where the threshing-cylinder is of small diameter, to run the fan at a greater speed than the cylinder. In order to accomplish this, suitable gearing is employed, which in the present embodiment is as follows: A bevel-gear 35 is secured to the inner end of the extended hub 18 of the fan-casing and is thus held stationary Another bevel-gear 36 is loosely journaled upon the shaft 16 and is also free to rotate with respect to the fan, this wheel having a clutch member 37, that is in the form of a toothed ratchet-wheel. The fan has fastened to the end adjacent the gear-wheel 36 a plate 38, on which is mounted another clutch member in the form of a spring-pressed dog 39, said dog being pivoted upon the plate and having its free end yieldingly urged into engagement with the teeth of the ratchet-wheel. A supporting device in the form of a collar 40 is mounted upon the shaft 16 between the opposed gear-wheels, said collar having a yoke 41, in which is journaled a third beveled gear-wheel 42, said wheel meshing with both the gear-wheels 35 and 36, and thus being rotatable with and with respect to the shaft 16.

Located over the cylinder is a carrier or support comprising spaced plates 43, pivoted at their rear ends, as shown at 44, their front ends being connected by links 45 with the crank-arms 46 of a rock-shaft 47, suitably journaled on the frame of the machine above the deck. The rock-shaft has a handle-arm 48 disposed adjacent to a slotted bar 49, through the slot of which is passed a holding-bolt 50, said bolt being carried by the arm 49 and constituting means for clamping said arm against movement. The spaced bars 43 are provided with curved ribs 51, constituting supports for a concave that consists of plates 52, the ends of which rest upon said ribs, said plates being provided with suitable teeth 53, coöperating with the teeth of the cylinders. The plates are held upon the ribs by curved retaining-bars 54, bolted, as shown at 55, to the supporting-plates 43. Guide-bolts 56 pass through slots 57, formed in the supporting-plates 43, and also act as clamps to hold said plates against movement.

For the purpose of feeding the material to the threshing mechanism an endless conveyer-belt 58 is employed, passing about a conveyer-shaft 59, located adjacent to the front side of the cylinder, said conveyer-belt operating beneath a series of cutter-bars 60. The rear ends of said bars are suspended by links 61, pivoted at their upper ends, as shown at 62, to the frame of the machine and having their lower ends operating in boxes 63, which boxes carry depending slotted ears 64, to which the bars are adjustably fastened. The front portions of the cutters are connected to the usual crank-shaft 67 by similar boxes 63ª, having slotted ears 64ª, to which are adjustably fastened keepers 65, in which the cutter-bars are secured by bolts 66. These bolts also fasten the keepers 65 to the ears 64ª, as illustrated in Fig. 9. Beneath the rear end of the conveyer 58 and conveyer-shaft 59 is preferably located a small shaker-pan 68, operated through the medium of a bell-crank lever 69, having a link connection 70 with a suitable part of the driving mechanism.

Interposed between the above-described feeding mechanism and threshing mechanism is a retarder, that is disposed just in advance of the concave. This retarder consists of an angular shaft 71, journaled in the supporting-bars 43 and carrying hubs 72, that are provided with radial teeth 73, said teeth thus rotating just in advance of the concave above the cylinder and in rear of the cutter-bars. Guards for the retarder consist of plates 74, that are angular in form and have their upper ends narrower than their lower ends, said upper ends being secured to a cross-bar 75, disposed slightly in advance of and above the retarder, the lower ends being secured to a cross-bar 76, located in rear of the retarder and directly adjacent to the concave.

A grain-pan 77 has its front end located beneath the cylinder and is separated therefrom by a partition 78, said partition having near its front end a grain-passage 79, opening into a pocket 80, formed by the curved upper end of a downwardly and rearwardly extending deflector-plate 81, the lower end of which is disposed just above the front end of the grain-pan. In rear of the cylinder and above the grain-pan is a fixed grate 82, over which operates an endless straw-carrier belt that has crossed slats 83, the rear sides of which on the upper stretch are beveled, as shown at 84. An apron 85, carried by a supporting-arm 86, is located in rear of the cylinder and extends downwardly toward the grate 82 and straw-carrier. Pivotally mounted above the apron is a bar 87, carrying a grate that consists of a plurality of rearwardly-extending fingers 88, which fingers are thus movable to different positions with respect to the straw-carrier, as clearly indicated in Fig. 1. A deflector-board 89 is pivoted, as shown at 90, in rear of the concave and is adjustable to different positions, as indicated in dotted lines. In rear of this straw-carrier is a stationary concave-deflector 91, extending over the straw-carrier and having stop or check plates 92 depending therefrom. This structure, together with the straw-carrier, is fully described in a copending application, Serial No. 272,914, and no claims are made herein to said structure, the same forming part of the subject-matter of said other application.

In the operation of this apparatus material is fed to the threshing-cylinder by the conveyer-belt, which carries the bundles beneath the cutters, where the bands are severed, and by having an overshot threshing-cylinder the conveyer may be placed very low upon the machine, thus making it much easier for the workmen to pitch the bundles thereupon. As the grain is fed to the cylinder it is continually taken from the top layer and carried into the retarder, which prevents a too great feed into the concave. After the straw passes through said concave it is delivered downwardly and rearwardly against the adjustable grate 88, the direction of delivery being controlled to a very material degree by the deflector 89. During its passage from the concave to the deflector it is moved through the blast of air from the fan, whereby the straw is thoroughly agitated and opened, permitting the grain to drop freely therefrom. The apron 85 serves to prevent the air-current and chaff following on around the cylinder; but all grain and material that are carried around will by centrifugal force pass through the outlet 79 into the pocket 80 and thence gravitate on to the grain-pan. The adjustment of the concave serves to insure the proper operation of the machine under different classes of work. Thus the position of the concave and retarder can be changed with relation to the cylinder accordingly as the grain is heavy and wet or light and dry. In the former condition, moreover, the deflector board or plate 89 is elevated, so that the straw strikes the carrier farther to the rear than when the said deflector is lowered, the latter position being preferable in dry grain.

The arrangement of the fan and casing, together with the driving means for said fan, is important, as a strong blast of air is thus maintained outwardly across the bars and tends to clear the teeth of the cylinder from the straw and prevent its wrapping about the cylinder. The inclined sides of the bars, moreover, offer but little resistance. The speed of the fan can be increased as desired by varying the relative sizes of the gear-wheels, and it will be observed in the structure as disclosed that the speed of the fan is not only double that of the cylinder, but its direction of movement is the same as that of said cylinder.

The clutch mechanism involved in the connection between the shaft and the fan is also an important feature of the invention, for, as is well known, the speed of the threshing-cylinder varies to a very material degree. In fact said cylinder is sometimes brought to a complete and sudden standstill. With the fan operating at a high rate of speed and rigidly geared to the cylinder-shaft these sudden checks would not only cause great strain upon the mechanism, but would be apt to result in breakage of the gearing or other parts.

In the present structure all danger of this kind is avoided, for if the speed of the cylinder is suddenly reduced the fan can freely rotate under its own momentum, the dog of the clutch member being movable freely over the teeth of the ratchet-wheel. As soon, however, as the cylinder-shaft again reaches the proper speed to drive the fan the dog will again interlock with the teeth and said fan will be positively driven. Thus it will be clear that the variation of speed on the part of the cylinder will not in any manner cause improper strains upon the fan and its associated driving mechanism.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a grain-separator, the combination with a rotary threshing member having a shaft, of a casing located in the member and having hubs in which the shaft rotates, and a fan located in the casing and driven by the shaft.

2. In a grain-separator, the combination with a rotary threshing member having a shaft, of a casing located in the member and having hubs in which the shaft rotates, means for holding the casing against rotation, and a fan located in the casing and driven by the shaft.

3. In a grain-separator, the combination with a shaft, of a rotary threshing member driven thereby and surrounding the same, a fan located within the member, and a casing interposed between the member and fan and having a hub in which the shaft rotates, said hub being interposed between the member and fan.

4. In a grain-separator, the combination with a shaft, of a rotary threshing member having a hub mounted on the shaft, a fan having a hub mounted on the shaft, and a fan-casing interposed between the fan and member and having a hub mounted on the shaft between said fan and member.

5. In a grain-separator, the combination with a shaft, of a rotary threshing member surrounding the shaft and having a hub fixed thereto, a fan located within the member and having a hub mounted on the shaft, and a fan-casing interposed between the fan and member and having a hub mounted on the shaft between the hubs of said fan and member.

6. In a grain-separator, the combination with a shaft, of a threshing-concave, a rotatable threshing member coöperating with the concave and comprising heads mounted on the shaft, tooth-bars connecting the heads, a fan mounted on the shaft within the cylinder, and a stationary fan-casing mounted on the shaft and interposed between the fan and cylinder, said casing having a discharge-throat that delivers the air from the fan outwardly across the cylinder tooth-bars.

7. In a grain-separator, the combination with a shaft, of a concave, a rotatable threshing-cylinder coöperating with the concave and comprising heads mounted on the shaft and tooth-bars connecting the heads, a fan comprising hubs mounted on the shaft and carrying blades, and a fan-casing comprising hubs in which the shaft loosely rotates, and an annular wall carried by the hubs and interposed between the blades and tooth-bars, said wall having an opening constituting a discharge-throat for the air from the fan.

8. In a grain-separator, the combination with a shaft, of a concave, a rotatable threshing-cylinder coöperating with the concave and comprising hubs with radial arms and tooth-bars connecting the arms, a fan comprising hubs mounted on the shaft and having radial arms carrying blades, and a fan-casing, said casing comprising hubs in which the shaft loosely rotates, said hubs having radial arms, and an annular wall carried by the hubs and interposed between the blades and tooth-bars, said wall being provided with openings constituting a discharge-throat.

9. In a grain-separator, the combination with a shaft, of a rotatable threshing-cylinder secured directly to the shaft and rotated thereby and therewith, a fan located within the cylinder on the shaft, and means mounted on the shaft and interposed between the fan and cylinder for directing the air from said fan.

10. In a grain-separator, the combination with a shaft, of a rotatable threshing-cylinder secured directly to the shaft and rotated therewith and thereby, a fan located within the cylinder, means supported directly on the shaft and interposed between the fan and cylinder for directing the air from said fan, and means for holding the said directing means against rotation with the shaft.

11. In a grain-separator, the combination with a machine-casing, of journal-bearings mounted on the opposite sides of the same, a shaft supported in the bearings, a threshing-cylinder mounted on the shaft within the machine-casing, a fan mounted on the shaft within the cylinder, and a fan-casing mounted on the shaft between the cylinder and fan.

12. In a grain-separator, the combination with a machine-casing having air-inlet openings in its opposite sides, of journal-bearings mounted on the opposite sides of the machine-casing and extending across the openings, a shaft supported in the bearings, a threshing-cylinder secured to the shaft within the machine-casing, a fan mounted on the shaft within the cylinder, a fan-casing mounted on the shaft between the cylinder and fan and having an air-discharge throat, and means for holding the casing against rotation with the shaft.

13. In a grain-separator, the combination with a shaft, of a threshing-cylinder, a fan mounted on the shaft, a fan-casing having a bearing through which the shaft rotatably passes, and means for positively holding the casing against rotatable movement on the shaft.

14. In a grain-separator, the combination with a shaft, of a threshing-cylinder, a fan mounted on the shaft, a fan-casing having a bearing through which the shaft rotatably passes, and means connected to the casing to hold the same against turning movement with the shaft, said means constituting a bearing for the shaft.

15. In a grain-separator, the combination with a machine-casing, of a shaft journaled thereon, a threshing-cylinder, a fan mounted on the shaft, a fan-casing having a bearing through which the shaft rotatably passes, and means surrounding the shaft and connecting the fan-casing and machine-casing to hold the former against rotation with the shaft.

16. In a grain-separator, the combination with a shaft, of a threshing member carried thereby, a fan mounted on the shaft, a fan-casing having a hub in which the shaft rotates, and means engaging the hub to hold the same and thereby the casing against rotation with the shaft.

17. In a grain-separator, the combination with a fan-casing having a hub, of a fan operating in the casing, and a rotary threshing member having a journal-bearing on the hub of the fan-casing.

18. In a grain-separator, the combination with a fan-casing having a hub, of a shaft having a bearing in the hub, a fan operating in the casing and driven by the shaft, and a rotary threshing member operated by the shaft and having a journal-bearing on the hub of the fan-casing.

19. In a grain-separator, the combination with a fan-casing having a hub, of means engaging the hub to hold the same against rotation, a shaft having a bearing in the hub, a fan operating in the casing and mounted on the shaft, and a rotary threshing-cylinder surrounding the casing, said cylinder being secured to the shaft and having a bearing on the hub of the casing.

20. In a grain-separator, the combination with bearing-supports, of a shaft extending transversely of said supports, a fan-casing having hubs at its ends, means carried by one of the supports and engaging the adjacent hub for holding the casing against rotation, and a fan mounted on the shaft within the casing.

21. In a grain-separator, the combination with spaced bearing-supports, of a shaft extending transversely of said supports, a fan-casing having hubs at its ends, means carried by one of the supports and engaging the adjacent hub for holding the casing against rotation, a fan rotatably mounted in the casing, and a threshing member secured to the shaft and having a bearing on the fan-casing hubs.

22. In a grain-separator, the combination with a machine-casing, of spaced bearing supports carried thereby, a shaft extending transversely through the casing and across the supports, a fan-casing having hubs through which the shaft loosely passes, one of said hubs being extended to the adjacent bearing-support, means carried by said support and engaging the extended hub to hold the same against rotation, a fan mounted on the shaft within the casing and driven by said shaft, and a threshing-cylinder surrounding the casing, said cylinder having hubs, one of which is secured to the shaft, the other being journaled upon the extended hub of the casing.

23. In a grain-separator, the combination with a rotatable threshing member, of a fan rotatably mounted within the same, and means for effecting the rotation of the member and fan in the same direction and at different speeds.

24. In a grain-separator, the combination with a shaft, of a rotatable threshing member carried thereby, a fan loosely mounted on the shaft, and means for rotating the fan on the shaft at a higher speed than the threshing member.

25. In a grain-separator, the combination with a shaft, of a rotatable threshing member carried thereby, a fan located within the threshing member, said fan being loosely journaled on and supported by the shaft, and gearing driven by the shaft and connected to the fan for rotating said fan at a higher speed than the threshing member.

26. In a grain-separator, the combination with a rotatable threshing member, of a rotatable fan, stationary means for directing a blast of air from the fan, and means associated with the member, the directing means, and the fan for effecting the rotation of said fan and member at different speeds.

27. In a grain-separator, the combination with a rotatable threshing member, of a rotatable fan journaled within the member, stationary means for directing a blast of air from the fan, and gearing associated with the member, the directing means and the fan for effecting the rotation of said fan and member at different rates of speed.

28. In a grain-separator, the combination with a shaft, of a rotatable threshing member carried thereby, a fan loosely mounted on the shaft within the member, a stationary fan-casing, and gearing associated with the shaft, the casing and the fan for driving said fan from the shaft.

29. In a grain-separator, the combination with a shaft, of a rotary threshing member carried thereby, a fan rotatable with respect to the member, a stationary gear, a gear carried by the fan, and another gear rotatable with and around the shaft, said gear meshing with the stationary gear and the fan-gear.

30. In a grain-separator, the combination with a shaft, of a rotatable threshing member carried thereby a fan loosely journaled on the shaft within the member, a stationary gear, a gear carried by the fan, a supporting device secured to the shaft and rotatable therewith and a gear rotatable with and rotatable on the support, said gear meshing with the stationary gear and the fan-gear.

31. In a grain-separator, the combination with a shaft, of a fan-casing having bearings in which the shaft rotates, a fan loosely journaled on the shaft inside the casing, a gear carried by the casing, a gear carried by the fan, and a gear carried by the shaft and meshing with said other gears.

32. In a grain-separator, the combination with a shaft, of a threshing-cylinder secured thereto, a stationary fan-casing mounted on the shaft and located within the cylinder, a fan loosely journaled on the shaft within the casing, a supporting device carried by the shaft, oppositely-disposed gears carried by the fan and casing, and another gear journaled on the supporting device and meshing with the oppositely-disposed gears.

33. In a grain-separator, the combination with a rotatable threshing member, of a rotatable fan, common driving means for said fan and member, and a clutch connection between the driving means and fan.

34. In a grain-separator, the combination with a shaft, of a threshing member and a fan mounted on the shaft, one of the same being loose thereon, and gearing connecting the shaft and loose member and including a clutch.

35. In a grain-separator, the combination with a shaft, of a threshing member mounted thereon, a fan loosely associated with the shaft and having a clutch connection therewith that permits the fan to operate at a greater speed than that of the threshing member.

36. In a grain-separator, the combination with a shaft, of a threshing member mounted thereon, a fan loosely journaled on the shaft within the member, and means connecting the shaft and fan and including a clutch.

37. In a grain-separator, the combination with a shaft, of a threshing member mounted thereon, a fan loosely journaled on the shaft within the member, a fan-casing, and gearing connecting the shaft and casing and having a clutch connection with the fan.

38. In a grain-separator, the combination with a shaft, of a casing having hubs in which the shaft rotates, a threshing-cylinder secured to the shaft and journaled on one of the casing-hubs, a fan journaled on the shaft between the casing-hubs, a gear on one of the casing-hubs, a gear having a clutch connection with the fan, and a gear rotatably mounted on and rotatable with the shaft, said latter gear meshing with the first-mentioned gears.

39. In a grain-separator, the combination with a threshing-cylinder, of spaced pivoted supporting-plates disposed contiguous thereto and having ribs on their inner sides, concave plates located between the supporting-plates and bearing against the ribs thereof, teeth carried by the concave plates and coacting with the cylinder, clamp-bars extended over the concave plates and secured to the supporting-plates, and means for adjustably fastening the supporting-plates to maintain the teeth at different distances from the cylinder.

40. In a grain-separator, the combination with a threshing-cylinder, of a concave pivotally mounted adjacent thereto, and means for adjusting the concave toward and from the cylinder and holding the same in adjusted position, said means including a rock-shaft having crank connections with the concave, and means for holding the rock-shaft in different positions.

41. In a grain-separator, the combination with threshing mechanism including a threshing-cylinder, of a rotary retarder associated with the threshing mechanism, said retarder being adjustable with respect to the threshing-cylinder.

42. In a grain-separator, the combination with threshing mechanism including a threshing-cylinder, of a pivotally-supported rotary retarder associated with the threshing mechanism, said retarder being adjustable with respect to the threshing mechanism, and means for holding the retarder in adjusted relation.

43. In a grain-separator, the combination with threshing mechanism comprising a threshing-cylinder and a concave coöperating therewith and adjustable with respect to the cylinder, of a retarder coöperating with the cylinder and adjustable with the concave.

44. In a grain-separator, the combination with a threshing-cylinder, of a support pivotally mounted adjacent thereto, a concave carried by the support, and a retarder also journaled on the pivoted support.

45. In a grain-separator, the combination with an overshot cylinder, of a support pivotally mounted thereover, a concave comprising plates secured to the support and having teeth coöperating with the cylinder, a rotary retarder journaled in the pivotal support in advance of the concave and having fingers, and means for raising and lowering the support to carry the concave and the retarder toward and from the cylinder.

46. In a grain-separator, the combination with a threshing-cylinder including heads having spaced tooth-bars, said bars having beveled sides, of a fan located within the cylinder and delivering a blast of air outwardly across the bars.

47. In a grain-separator, the combination with a threshing-cylinder, of a concave pivotally mounted adjacent thereto, and means for adjusting the concave toward and from the cylinder, said means including a rock-shaft having crank-arms, links connecting the crank-arms and concave, an actuating-arm connected to the rock-shaft, and means for holding the actuating-arm in different positions.

48. In a grain-separator, the combination with a cylinder, of a pivoted concave coöperating therewith, a rotary retarder journaled on the concave and having teeth, and guards located between the teeth and secured to the concave.

49. In a grain-separator, the combination with an overshot cylinder and concave located above the same, of a straw-carrier disposed in rear of the cylinder, a grate pivoted in rear of the cylinder and having rearwardly-extending teeth located over the carrier, and a deflector pivoted in rear of the concave and over the cylinder and directing the material downwardly toward the grate and carrier.

50. In a grain-separator, the combination with a machine-casing having openings in its side walls, of bearing-supports extending across the openings, a shaft, a fan-casing having hubs in which the shaft loosely revolves, one of said hubs being fixed to one of said bearing-supports, an overshot threshing-cylinder keyed at one end to the shaft and having a bearing at its other end upon the fixed hub, a fan loosely journaled on the shaft within the casing, gearing associated with the shaft and having a clutch connection with the fan for driving the same, a pivoted support located over the cylinder, a concave carried by the support, means for feeding material to the cylinder, a retarder journaled on the support between the concave and the feeding means, means for adjusting and holding the support in adjusted positions, a straw-carrier disposed in rear of the cylinder, a grate pivotally mounted in rear of the cylinder and extending over the carrier, and a deflector for directing material to the grate, said deflector being disposed in rear of the concave.

51. In a grain-separator, the combination with an overshot threshing-cylinder and concave located above the same, of a grain-pan beneath the cylinder, a partition interposed between the cylinder and pan and having a grain-opening, and a deflector extending from the front portion of the opening downwardly and rearwardly above the grain-pan.

52. In a grain-separator, the combination with an overshot threshing-cylinder and concave located above the same, of a grain-pan disposed beneath the cylinder and concave, a partition interposed between the cylinder and pan and having a grain-pan contiguous to its front end, and a deflector extending from the front portion of the opening downwardly and delivering to the grain-pan, the upper end of the deflector having a forwardly-curved portion forming a receiving-pocket.

In testimony that I claim the foregoing as my own I have hereto affixed my signature in the presence of two witnesses.

SAMUEL DUNKELBERGER.

Witnesses:
JOHN H. LINN,
PETER P. CARBIENER.